United States Patent [19]
Lusby et al.

[11] Patent Number: 5,418,362
[45] Date of Patent: May 23, 1995

[54] ENCODER FOR DETERMINING ABSOLUTE LINEAR AND ROTATIONAL POSITIONS

[76] Inventors: Brett L. Lusby, 126 N. St. Paul, Wichita, Kans. 67203; Kenneth D. Hauschild, 403 N. Tyler Rd., Wichita, Kans. 67212

[21] Appl. No.: 67,584

[22] Filed: May 27, 1993

[51] Int. Cl.⁶ .............................. G01D 5/34
[52] U.S. Cl. ................ 250/231.18; 250/237 G
[58] Field of Search ............ 250/231.18, 231.13, 250/231.14, 231.16, 237 G; 341/13, 14, 9, 6, 7, 10

[56] References Cited
U.S. PATENT DOCUMENTS

| | | | |
|---|---|---|---|
| 4,422,065 | 12/1983 | Radomirov et al. | 250/231.18 |
| 4,786,891 | 11/1988 | Ueda et al. | 341/13 |
| 4,901,072 | 2/1990 | Fox | 341/10 |
| 4,947,166 | 8/1990 | Wingate et al. | 341/13 |
| 5,036,468 | 7/1991 | Roselli | 364/426.05 |
| 5,068,529 | 11/1991 | Ohno et al. | 250/231.18 |
| 5,091,643 | 2/1992 | Okutani et al. | 250/231.14 |
| 5,117,105 | 5/1992 | Nagase et al. | 250/231.18 |
| 5,121,116 | 6/1992 | Taniguchi | 341/116 |
| 5,211,539 | 5/1993 | McCarty | 250/231.13 |

Primary Examiner—David C. Nelms
Attorney, Agent, or Firm—Shook, Hardy & Bacon

[57] ABSTRACT

An encoder and a code plate are provided for determining absolute position. The code plate generally comprises a substrate, at least two bands formed on the substrate corresponding factors of the desired count, two positions formed within each band, and an identifier in each band for identifying each band position so that each code plate position is uniquely identified by reading the band identifiers. In a preferred embodiment, one of the bands comprises a base band having a number of positions equal to a power of two. Further, the sections of each band are formed in a factored relationship so that one of the bands comprises a number sections equal to the count, and also to ensure that only one bit changes at a time when the encoder reads adjacent positional codes. In another aspect of the invention, a method is disclosed for constructing such a code plate. Further, in another embodiment, the encoder is provided with a redundancy check to ensure detection of and isolation of errors on the code plate.

59 Claims, 2 Drawing Sheets

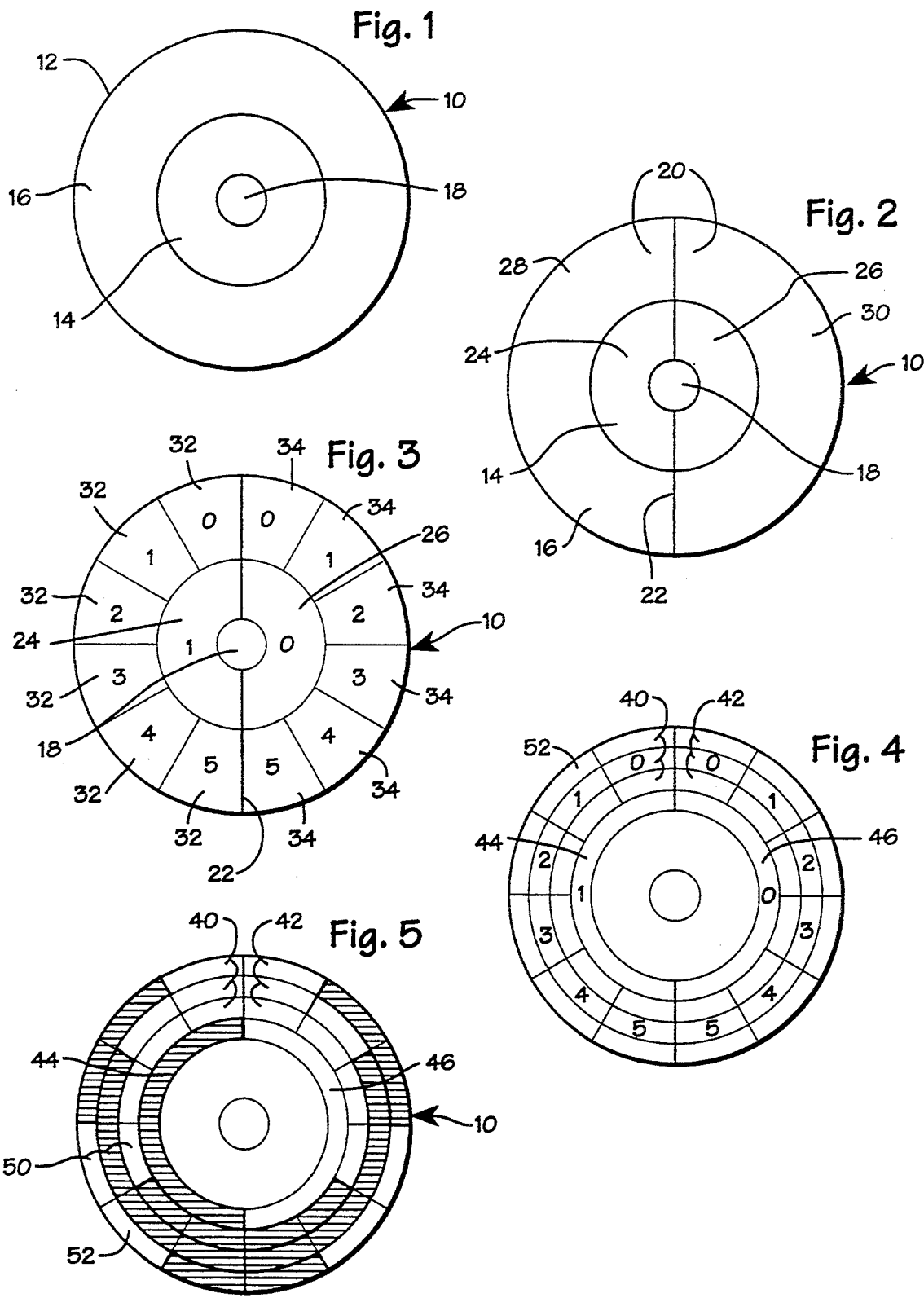

ENCODER FOR DETERMINING ABSOLUTE LINEAR AND ROTATIONAL POSITIONS

BACKGROUND OF THE INVENTION

1. Field of the Invention

This invention relates to an apparatus and method for determining linear and rotational position using an encoder and, more particularly, to an apparatus and method for determining absolute linear and rotational position using such an encoder.

2. Description of the Related Art

Encoders are used in a number of practical applications. Linear encoders are used to indicate the linear position of mechanically movable members, and rotary encoders indicate the angular position of rotating elements such as the shaft of a motor. For example, encoders may be used to measure the position of a robotic arm. Encoders may also be used in place of a potentiometer in airplanes or other navigational craft. Additionally, U.S. Pat. No. 5,036,468 describes the use of an encoder on trains.

There are two basic types of encoders: incremental encoders and absolute encoders. Incremental encoders employ external circuitry to count pulses, and the incremental position is defined by the number of pulses counted in relation to a datum or starting point. A fundamental problem with incremental encoders arises when a power failure or interruption occurs so that the datum is no longer available as a reference point. In other words, an isolated or static reading of incremental position does not disclose an actual or absolute position because incremental position is relative to an initial reading.

Absolute encoders, on the other hand, independently determine an actual or absolute position without relying on datum or external circuitry. Therefore, an isolated or static reading of absolute position overcomes the fundamental limitation of incremental encoders by always providing a reading of actual position.

Absolute position encoders utilize a sequence of positional codes stored in binary form on a code plate and a plurality of sensors that read the positional codes. In linear applications, the code plate is an elongated member having a plurality of linearly arranged parallel code tracks. By contrast, a rotary encoder utilizes a code disk with a plurality of concentric code tracks. Code sensors read the positional codes optically, magnetically, by direct contact or by other means known in the art. However, using nonoptical techniques may decrease the life of the sensors and the code disk as a result of friction and/or vibration. Thus, optical encoders are usually preferable to non-optical encoders due to easier computer interfacing, improved accuracy and durability, and increased reliability.

Conventional rotary optical encoders consist of a code disk, a source of light, and an array of light sensors or detectors. As the disk rotates, the positional codes on the disk are read by the light sensors. The code may then be translated into a number that represents the rotation angle of the shaft, typically in degrees.

The positional codes generally used on code disks are known as gray codes. A gray code is a modified binary code that allows only one bit to change at a time as the disc rotates between angular positions. This feature is important for optical encoders because of the ambiguities that would arise if the encoder were to stop exactly halfway between two positions and two or more bits were changing at that time. Since only one bit changes at a time, gray code encoders have a resolution of plus or minus one bit. Resolution is the degree of accuracy in determining absolute position. The following table illustrates the relationship between decimal, binary, and gray code from "0" to "9":

| DECIMAL | BINARY | GRAY |
|---------|--------|------|
| 0 | 0000 | 0000 |
| 1 | 0001 | 0001 |
| 2 | 0010 | 0011 |
| 3 | 0011 | 0010 |
| 4 | 0100 | 0110 |
| 5 | 0101 | 0111 |
| 6 | 0110 | 0101 |
| 7 | 0111 | 0100 |
| 8 | 1000 | 1100 |
| 9 | 1001 | 1101 |

In constructing code plates using gray code, a significant limitation requires the number of detectable positions (referred to herein as the "count") of the code plate to be a power of two (i.e., 2, 4, 8, 16, etc.). If a count other than a power of two is coded on the code plate, more than one bit will undesirably change during the transition from the last positional code on the plate to the first positional code on the plate. For example, to construct a code disc with 5 positions, the first position on the disc is "0" (0000) and the last position is "4" (0110), and thus, in transitioning from the last position "4" to the first position "0" on the code disc, two bits change. In contrast, a rotary encoder designed to read eight positions, i.e., a count of 8, for example, will have a resolution of one bit because only one bit changes at a time, even as the disk begins a new revolution and rotates from position 7 ("0100") to position 0 ("0000"). Even if the sensors cannot identify the changing bit, the absolute position on the code disk must either be position 7 or position 0 because the other bits are identifiable. Thus, an encoder designed for a position count equal to any power of two will have a resolution of plus or minus one bit at all times.

The requirement that the number of positions of the count equal a power of two profoundly limits the utility of conventional gray code optical encoders. With more than one bit changing at a time on the code disk, the encoder cannot accurately determine absolute position within one bit. Therefore, the prior art methods of determining absolute position fail to maintain a resolution of plus or minus one bit for the vast majority of potential applications.

Perhaps the most common practical application for encoders is a 360 count disk for determining angular position (in degrees) about a shaft. Significantly, more than one bit will change at a time as a conventional 360 count disk rotates clockwise from the last position to the first position because the number 360 is not a power of two. Moreover, a conventional gray code rotary encoder may be divided into 256 ($2^8$) positions or 512 ($2^9$) positions, but not 360 positions or any other number of positions between 256 and 512 without substantially compromising its resolution. Because so many practical applications require an encoder that can read 360 degrees (or positions), a reading from a conventional 512 count encoder has been divided by 1,422 to get a number representing the degree angle of the shaft. However, this method is susceptible to an accumulation of mathematical precision errors, such as rounding errors inherent in the division step. Further, using a 512 count encoder rather than a 360 count encoder may involve reading or calibration errors that would not be present in an encoder designed for 360 positions.

Another problem in the prior art involves the slow recognition of incorrect readings. For example, when a sensor becomes nonfunctional in an optical encoder, the encoder may give incorrect readings. Before this faulty sensor is replaced, however, the incorrect readings may go unnoticed for quite some time. Such inefficiency obviously detracts from the effective performance of the encoder.

SUMMARY OF THE INVENTION

Accordingly, a primary object of the present invention is to provide a code plate and a method of constructing such a plate which will determine the linear or rotational position for any count. Stated alternatively, an object is to provide a code plate which is not limited to a count which is a power of two.

Another object of this invention is to provide a new method for constructing such a code plate and for determining absolute position with an encoder so that the code plate may be designed for any desired count, including counts not equal to a power of two. Thus, an object is to provide a code plate which allows an encoder to determine the absolute position for all desired applications, regardless of the count.

A related object of this invention is to provide an encoder having a code plate for determining absolute position for either linear or rotary applications so that the plate provides greater flexibility and precision than conventional encoders when measuring absolute position.

More specifically, an object of this invention is to provide a code plate and a method of making a code plate for an encoder so that it comprises at least two bands, each band having at least two sections and an identifier for identifying each section, to thereby overcome the prior art limitation of coding counts which are a power of two.

It is also an object of this invention to generate a sequence of positional codes for an absolute position encoder so that only one bit of the code changes at a time, even for counts other than a power of two, to thus ensure accurate measurement of the absolute position.

Yet another object of this invention is to provide secondary means of determining position on a code plate with an encoder so that incorrect readings and faulty hardware may be detected immediately.

To accomplish these and related objects, in separate aspects, the invention is directed to a code plate for representing positions of a desired count and an encoder employing the code plate. The code plate comprises a substrate having a band corresponding to at least two factors of the count, each of the bands being sectioned into a number of sections, and an identifier affixed to the substrate for identifying each position on the substrate.

In a preferred embodiment, one of the bands comprises a base band. The base band is sectioned into a number of sections equal to the number of sectors and associated with the sectors. The band(s) other than the base band ("secondary band(s)") are sectioned into a number of sections to establish a factored relationship among the base band and the secondary band(s), such that one of the secondary band(s) comprises a number of sections equal to the desired count.

Also in a preferred embodiment, the identifier comprises tracks representative of a binary code. The tracks are affixed within each section of each band to identify each section on the substrate. The binary code preferably comprises a gray code.

In more specific embodiments, the bands are arranged generally concentrically for representing angular positions. Alternatively, the bands are arranged linearly and substantially parallel for representing linear positions.

In another aspect, the invention is directed to a method for creating a code plate for representing positions of a desired count. The method comprises the steps of: dividing the count into a number of factors; providing a substrate; forming a number of bands on the substrate equal to the number of factors; sectioning each of the bands into a number of sections; and affixing an identifier to the substrate for identifying each section on the substrate. In one embodiment, the dividing step comprises dividing the count into a number of factors, at least one of the factors being a power of two. Further, the forming step comprises forming the bands adjacent to one another, and the sectioning step comprises sectioning one of the bands (a "base band") into a number of sections equal to the number of sectors and associated with the sectors. The sectioning step further comprises sectioning the band(s) other than the base band ("secondary band(s)") into a number of sections to establish a factored relationship among the bands, such that one of the bands comprises a number of sections equal to the count.

In another aspect of the invention to further increase the accuracy of the encoder, the encoder is provided with secondary means for performing redundant readings for error determination. For an optical encoder, the encoder preferably comprises at least two sets of emitters and detectors for detecting erroneous readings of the code plate. For rotary encoders, the encoder preferably comprises three sets of emitters and detectors, each emitter and detector set being spaced generally 120 degrees apart.

Thus, it can be seen that the present invention overcomes the problems associated with prior art encoders. The encoder of the present invention is not limited to counts which are equal to a power of two. Further, the redundancy checking further ensures and increases the accuracy of the positional measurements of the encoder.

BRIEF DESCRIPTION OF THE DRAWINGS

In the accompanying drawings which form a part of the specification and are to be read in conjunction therewith and in which like reference numerals are used to indicate like parts in the various views:

FIG. 1 is a top plan view of a code disk in accordance with the present invention which is divided into two bands;

FIG. 2 is a top plan view of the code disk shown in FIG. 1 that is further divided into two sectors;

FIG. 3 is a top plan view of the code disk shown in FIG. 2 where one of the bands is divided into twelve sections;

FIG. 4 is a top plan view of the code disk shown in FIG. 3 where the bands are divided into four code tracks;

FIG. 5 is a top plan view of a twelve count code disk for use in an absolute position encoder according to an embodiment of the present invention;

DESCRIPTION OF THE PREFERRED EMBODIMENTS

Figure 6:
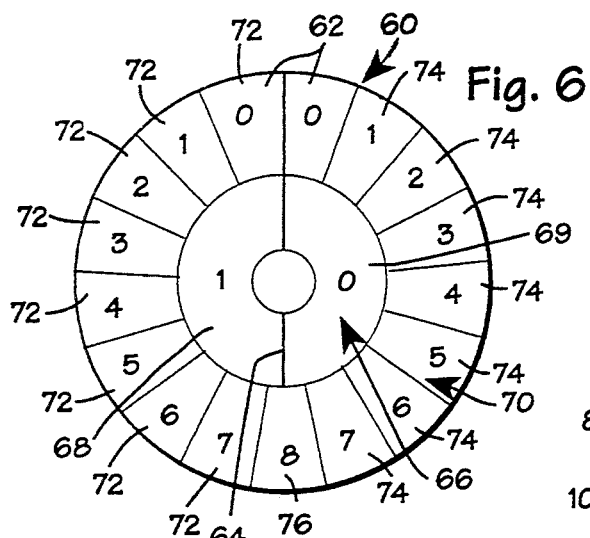
FIG. 6 is a top plan view of the code disk shown in FIG. 1 where one of the bands is divided into fifteen sections in accordance with an embodiment of the present invention for code disks with an odd position count.

Referring initially to FIGS. 1–5, a code plate is shown which is constructed according to the preferred method of the present invention, and is generally designated by the numeral 10. FIGS. 1–5 illustrate the steps of the preferred method for constructing the code plate 10, which is a rotary code disk for representing angular position. However, as will be described below, the method may also be used to create a linear code plate for representing linear position (see FIG. 8).

First, the number of positions on the code plate, referred to herein as the count, must be determined. The rotary code disk 10 shown in FIGS. 1–5 is a 12-count disk because it represents twelve angular positions. The count must be divided into at least two factors. The possible factor combinations for the count "12" in FIGS. 1–5 are: "2×6", "2×2×3", "4×3", and "1×12". However, at least one of the factors must be a power of two, as will be explained below. Thus, the factor combination "1×12" should not be used to construct the code plate 10 according to the method of this invention because it does not comprise a power of two. Therefore, any of the three remaining factor combinations may be selected to create code disk 10. FIGS. 1–5 illustrate a code plate constructed using the factors "2×6".

A substrate 12 is divided into a number of bands equal to the number of factors, and thus, there must be at least two bands: a "base band" 14 and one or more "secondary bands" 16. For the example given, the base band 14 corresponds to the factor "2" and the secondary band 16 corresponds to the factor "6". In FIG. 1, the inner band is shown as the base band 14. Nevertheless, the base band could be the outer band without affecting the operation of the code disk. Substrate 12 also comprises a hub 18, which is unusable space on the code plate 10.

Referring to FIG. 2, the substrate 12 is divided into a number of sectors 20 equal to the value of one of the factors that is a power of two. In the example given (i.e. "2×6"), the factor, and therefore the number of sectors is two (2). The line 22 divides the code plate 10 in half, and thus, the sectors are configured generally as half circles If the factor were "4", there would be four sectors configured generally as quarter circles. An additional line (not shown), perpendicular to line 22, would be required to divide the substrate. The number of sectors can be equal to any power of two, however the fewest number of sectors simplifies the design. Thus, for a count of twelve (12), the factor combination of "3×4" (requiring 4 sectors) could be used, but the "2×6" factor combination is selected for FIGS. 1–5, so that substrate 12 is divided into only two sectors 20 by line 22.

The lines that form the sectors on the substrate (in the example, line 22) necessarily divide the base band into a number of sections equal to the number of sectors 20 on the substrate. In the example given, the base band 14 is divided two sections 24 and 26.

Next, the secondary bands (in the example, band 16) must be sectioned into a factored relationship with the sections 24 and 26 of base band 14. Referring to FIG. 2, the line 22 also divides the secondary band 16 into two portions 28 and 30 corresponding to the sections 24 and 26, respectively, of the base band 14. That is, portion 28 is concentrically adjacent to section 24, and portion 30 is concentrically adjacent to section 26. Referring to FIG. 3, to establish the factored relationship, the portions 28 and 30 are each divided into a number of sections 32 and 34, respectively, equal to the number of a remaining factor. For the example given, the number "2" was used for the base band 14, and thus the remaining factor is "6". Therefore, there are six sections 32 and six sections 34. If the code plate were constructed using three factors, such as "2×2×3", the remaining factors would be "2" and "3", and either the "2" or "3" could be used to section the band adjacent to the base band, as will be described in greater detail below for FIG. 7. The sections 32 form a factored relationship with the section 24 of base band 14, and the sections 34 form a factored relationship with the section 26 of the base band, such that the total number of sections 32 and 34 of the secondary band 16 equals the number of the count, i.e., 12.

Next, each of the sections on the substrate (i.e., sections 24 and 26, sections 32 and sections 34) are assigned a decimal number corresponding to a binary number which is preferably coded on the code plate 10, as will be described below. Thus, assigning the decimal number is merely an illustrative transitional step which need not be implemented in practice. Referring to FIG. 3, the two sections 24 and 26 of the base band 14 are labeled with the decimal numbers "1" and "0" respectively. The six sections 34 are labelled consecutively from top to bottom in clockwise rotation as the decimal numbers "0"–"5" to form a factored relationship with section 26 of the base band. The six sections 32 are labelled consecutively from bottom to top in clockwise rotation as the decimal numbers "5"–"0" to form a factored relationship with section 24 of the base band 14. Importantly, the decimal numbers at the border (created by line 22) of the sectors 20 are identical. This ensures that as the encoder reads the code plate 10, and transitions from one sector to another sector, only the number corresponding to the sections 24 and 26 of the base band changes. This ensures that only one bit changes when the encoder transitions between sectors when reading the code plate 10. The factored relationship between the sections of the base band 14 and the sections of the secondary band 16 allow each section to be uniquely identified so that the encoder may determine the absolute position of the code plate 10. It should also be understood that the numbering of sections could be reversed and performed in the counterclockwise direction.

As stated above, the step of assigning decimal numbers as described is only for illustrative purposes, and serves as a mental transition step prior to encoding the code plate 10 with a binary identifier. As described above in the "Description of the Related Art" the code plate 10 should be encoded with a binary code which is commonly referred to as "gray code." The table of the binary representation for gray code for decimal numbers "0"–"9" is set forth therein. As explained, the gray code is a modified binary numbering system which ensures that only one bit changes between consecutive decimal numbers represented in gray code.

An identifier is affixed to the code plate 10 to provide a representation for the decimal number of each of the sections on the code plate. Referring to FIGS. 4 and 5, in the preferred embodiment, the identifier comprises tracks corresponding to binary numbers which are affixed to the substrate 12 to provide a binary representation (in gray code) of the decimal number of each section. In particular, track identifiers 40 provide a binary representation for the decimal numbers of sections 32 of secondary band 16, and track identifiers 42 provide a binary representation for the decimal numbers of sections 34 of secondary band 16. Track identifier 44 provides a binary representation for the decimal number of section 24 of the base band 14, and track identifier 46 provides a binary representation for the decimal number of section 26 of the base band 14. As shown in FIG. 5, the shading represents a binary "1" and the nonshaded areas represent a binary "0". For example, referring to the section corresponding the decimal number "2" of section 32 of the secondary band 16, the binary representation for that section is "011" which corresponds to the binary gray code for the decimal number "2". The dark shaded areas correspond to opaque areas on the substrate 12, and the nonshaded areas correspond to translucent areas on the substrate. The opaque and translucent areas allow the encoder to determine whether a particular track section, such as sections 50 represent a binary "0" or "1". It should be understood that the binary "0" could be represented by the opaque (i.e., dark shaded regions), and the binary "1" could be represented by the translucent (i.e., the nonshaded regions).

Also, as is well known in the art, the number of tracks necessary to represent the sections for a particular band is dependent on the largest value of a section located within a particular band. The number of tracks necessary to represent a number of positions N is given by the equation: $N=2^x$ where "x" equals the number of tracks. For example, the base band 14 only has two sections and thus, only requires one track comprising the track identifier 44 corresponding to the binary "1" position and the track identifier 46 corresponding to the binary "0" position. The secondary band 16 requires identification of six positions, i.e., positions corresponding to decimal numbers "0"–"5". Thus, three tracks are necessary to provide a binary code for six positions, with two positions corresponding to the seventh and eighth positions being unused.

To determine the absolute position on the code plate 10, the base band portion of the code is the most significant bit (MSB) of the positional code. It therefore serves as a sign bit. When, as in FIGS. 1–5, the innermost band of the substrate 12 is the base band 14, the outermost track 52 is preferably the least significant bit (LSB) of the positional code for the secondary band 16, and the LSB of the entire positional code comprising the base band positional code and the secondary band positional code. Such positioning allows the scanner to read the bits in order of significance which reduces the programming necessary to process the bit information. By adding the positional codes of the base band 14 and the secondary band 16, a composite positional code is created which uniquely identifies the absolute angular position for the code plate 10. Thus, the identifier for code plate 10 comprises a sequence of positional codes around the entire code plate 10 such that only one bit changes at a time for any position count.

A count of 360, corresponding to 360 degrees, is particularly important for a rotary code plate which represents angular position. A 360 count disk (N=360) may be designed using the factors "2×180". First, the disk is divided into two bands, one corresponding to each factor, and two sectors because the power of two factor is "2". The base band therefore necessarily comprises two sections, and the secondary band is thereafter divided into 180 sections for each section of the base band, such that the secondary band comprises a total of 360 sections. Each angular position on the disk may be referenced from "0" up to "179" for the base band section "0" and from "179" back down to "0" for the base band section "1". Finally, the decimal reference numbers corresponding to each section on the code plate are encoded with binary gray code represented by opaque and translucent track sections.

Referring to FIG. 6, designing a code plate 60 with an odd number position count is a special case because the position count is not evenly divisible by a power of two. However, the mathematical factors of the position count may be fractions, so the factor combination "2×8.5" may be used to design the "17" count disk 60 illustrated in FIG. 6. Accordingly, disk 60 comprises two sectors 62 formed by line 64 because the power of two factor is two. The base band 66 necessarily comprises two sections 68 and 69, as described above for the code plate shown in FIGS. 1–5. Further, the secondary band 70 is divided into: eight sections 72 bearing a factored relationship to section 68 of the base band 66; eight sections 74 bearing a factored relationship to section 69 of the base band 66; and an odd count section 76 bearing a factored relationship to both sections of the base band to compensate for the odd number count.

The odd count code plate is designed by the same method as the even count code plate except that the odd count section 76 of the secondary band 70 is located in more than one sector 62. Referring to FIG. 6, the decimal reference number "8" corresponding to section 76 is located within both sector "0" and sector "1" corresponding to sections 68 and 69 of the base band 66. Line 64, which separates the two sectors 62, divides base band 66 into two sections 68 and 69, but does not subdivide section 76 of the secondary band 70. Importantly, when the encoder which reads the code plate 60 transitions from one sector to another, the sections of the secondary band remain the same (i.e., either "0" or "8"), and only the base band changes (i.e., between "0" and "1"). Thus, only one bit changes when the encoder transitions between sectors for the odd count disk.

Finally, code tracks (not shown) must be affixed to the code plate 60 within the bands to provide a binary gray code corresponding to the decimal number of each section of the code plate 60, as described above for the code plate of FIG. 5. However, the secondary band 70 in FIG. 6 requires four code tracks to uniquely identify the nine positions of that band, i.e., positions corresponding to the decimal numbers "0"–"8".

Figure 7:
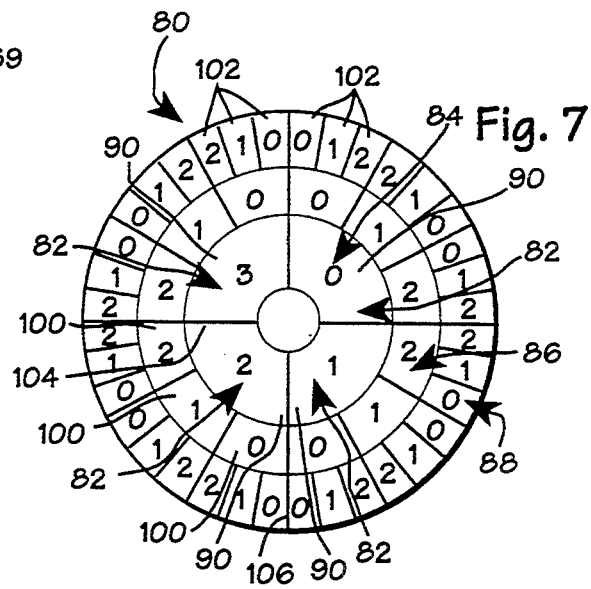
FIG. 7 is a top plan view of a code disk that is divided into three bands and four sectors, and one of the bands is divided into thirty-six sections.

In FIG. 7, a 36-count code disk 80 comprises four sectors 82 and three bands comprising base band 84 and secondary bands 86 and 88. Disk 60 utilizes the factor combination "4×3×3" so that base band 84 has four sections 0. Secondary band 86 comprises three sections 100 for each of the sections 90 of the base band 84 (or twelve sections total), and secondary band 88 comprises three sections 102 for each section 100 of secondary band 86. Thus, the secondary band 86 comprises 36 total sections which equals the number of the count. Thus, a factored relationship is established among the base band 84 and the secondary bands 86 and 88 so that one of the secondary bands, typically the outermost or innermost band depending on the code plate design, comprises a number of sections equal to the count ("36"). Moreover, the product of the factors corresponding to the secondary band(s) determines the number of sections per sector in the band comprising the number of sections equal to the count. As applied to FIG. 7, secondary band 88 has nine sections per sector because the product of the factors corresponding to the secondary bands ($3\times 3$) equals nine.

The four sectors 82 are formed by orthogonal lines 104 and 106. Importantly, as the encoder reads the code plate 80 and transitions from one sector to another sector, only the positional code for the base band 84 changes. The orthogonal lines 104 and 106 demarcate the boundaries of the sectors 82, and as shown in FIG. 7, the positional codes for the sections 100 and 102 of secondary bands 86 and 88, respectively, remain either "0" or "2" when the encoder transitions between sectors. The base band 84 changes from "0" to "1" to "2" to "3" and back to "0" as the encoder scans the code plate 80 in a clockwise direction. Thus, only one bit changes as the encoder scans the sequential positional codes of the code plate.

Figure 9:
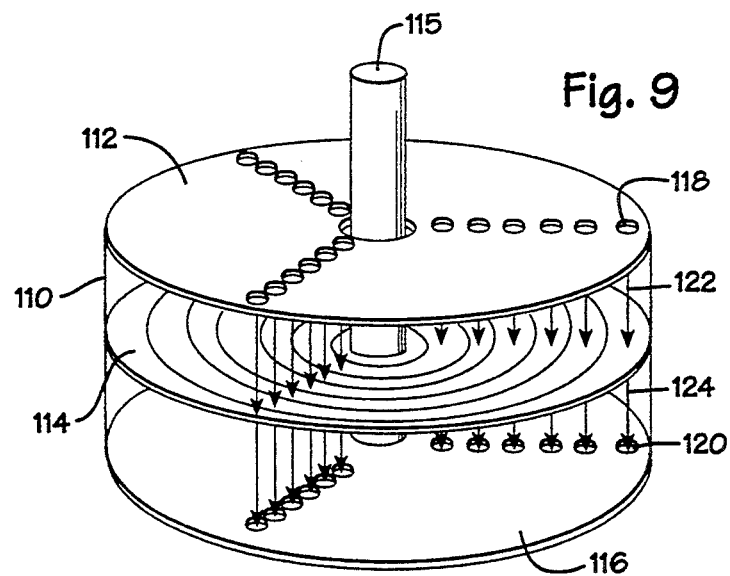
FIG. 9 is a perspective view of a rotary optical encoder for determining absolute position according to an embodiment of the present invention.

Referring now to FIG. 9, an encoder is shown which provides for redundant readings of the code plate for determining erroneous readings by the encoder. In particular, FIG. 9 shows an optical encoder 110 comprising an emitter card 112, a code disk 114, and a detector card 116 secured about shaft 115. Emitter card 112 has several light emitter arrays 118, and detector card 116 has a corresponding number of light detection arrays 120. In encoder 110, light travels downwardly through emitter array 118, and along the path of arrow 122. If the identifier allows light to pass through it when the light represented by arrow 122 reaches code disk 114, then the light will continue to travel downwardly along the path of arrow 124 to light detection array 120 on detection card 116.

A portion of the identifier that allows light to pass through it may arbitrarily be designated a binary value of "1", in which case a portion of the identifier that does not allow light to pass through it is assigned a binary value of "0". Of course, an opaque identifier portion may alternatively be designated a binary value of "0". If so, the translucent portion of the identifier is assigned a binary value of "1". The present invention contemplates the use of any such identifier characteristic by one skilled in the art for distinguishing between binary values and determining absolute position.

The primary advantage of providing at least one set of redundant emitter and light detection arrays is the early detection of incorrect readings and faulty hardware. Each time encoder 110 measures absolute position, three separate measurements are actually made. In FIG. 9, the arrays are located at 120 degree intervals so that each set of arrays should yield an absolute position 120 degrees from the other two sets of arrays. If, however, one set of arrays were to yield an absolute position inconsistent with the other two sets of arrays, then the encoder may be inspected and repaired. Further, the inconsistency with the readings may be limited to a single bit of the positional code, in which case the areas for inspection of the encoder will be conveniently isolated. While FIG. 9 shows an optical encoder, the redundancy measurements for error detection applies to other types of encoders such as magnetic or mechanical wiper encoders.

The present invention is also applicable to measuring absolute linear position. The primary difference in code plates for linear applications is that the bands, code tracks, and identifiers are substantially parallel to one another, rather than substantially concentric to one another.

Figure 8:
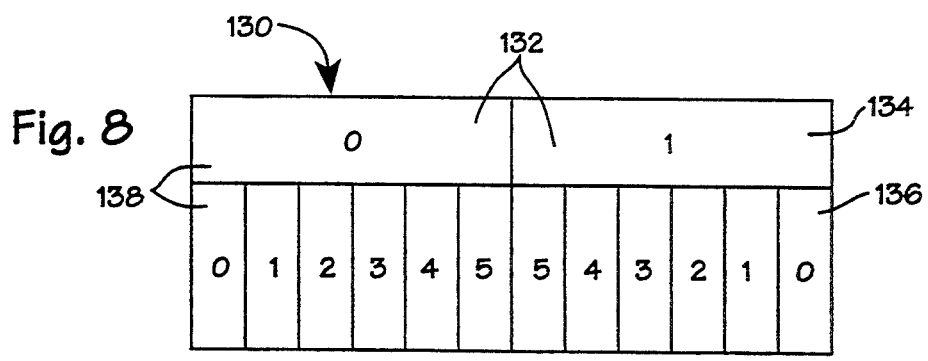
FIG. 8 is a top plan view of a linear code plate that is divided into two bands and two sectors, and one of the bands is divided into twelve sections.

Referring to FIG. 8, a "12" count linear code plate 130 comprises two sectors 132, a base band 134, and one secondary band 136. Base band 134 and secondary band 136 are generally parallel to one another. Base band 134 comprises one section 138 per sector 132, and secondary band 136 comprises six sections 138 per sector 132.

The combination of factors selected for a code plate dictates the number of sectors, the number of bands, and the number of sections in the bands. For code plate 130, the factor combination "$2\times 6$" requires two sectors 132, two bands 134 and 136, two sections 138 in band 134, and twelve sections 138 in band 136. In other words, the number of bands equals the number of factors, and the value of the first factor, which must be a power of two, equals the number of sectors and the number of sections in the base band. For the example shown in FIG. 8, there is only one secondary band because there are only two factors. The value of the remaining factor ("6") equals the number of sections per sector in the secondary band. This "factored relationship" among the bands provides one band that comprises a number of sections equal to the count, and only one bit on the code plate will change at a time.

Further, the redundancy error checking described above for the rotary encoder shown in FIG. 9 can be applied to linear encoders as well. At least two readings must be taken which in spaced apart relation so that a measurement discrepancy can be readily identified. For example with an optical encoder, if two emitter/detector pairs are spaced two inches apart and provide simultaneous readings of "12 inches" and "26 inches", an error is obviously present.

Thus, the code plate hereinabove described allows the absolute position of any count to be determined with maximum accuracy by ensuring that only one bit in sequential positional codes changes. Further, the code plate provides accurate positional measurement for rotary and linear applications. This allows the code plate to be utilized in those applications requiring precision. Of particular importance, the code plate of this invention is not limited to counts which are a power of two, and thus overcomes the significant prior art problem for encoding a 360 count disc which corresponds to 360 degree angular measurement. Further, the encoder disclosed herein provides for redundancy error checking to promptly diagnose an improperly operating encoder as well as to isolate the problematic area on the code plate.

It can also be seen that the code plate can readily be prepared in accordance with the present invention by dividing the desired count into a number of factors and forming a number of bands on a substrate equal to the number of factors. Further, the method comprises sectioning each of the bands into a number of sections representing positional codes and affixing an identifier, preferably a binary gray code, to the substrate for identifying each position on the code plate. Thus, the code plate constructed according to this method is not more difficult than the method of constructing prior art code plates, and yet the code plate constructed herein provides greater flexibility and accuracy in determining absolute positions.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. An absolute encoder code plate for representing positions of a desired count which is not a power of two, the code plate comprising:
   a substrate having a base band and at least one secondary band, the base band and the secondary band(s) being concentric about an axis and each base band and secondary band(s) being sectioned into a number of sections, the base band having a number of sections equal to a power of two; and
   identifiers for identifying each section on the substrate as a binary number comprising at least one bit, the sections being arrayed and the identifiers being applied so that a sequence of composite rotational position codes corresponding in number to the count are formed by the identifiers lying along imaginary radial lines placed at successive predetermined rotational positions about said axis, said composite rotational position codes being characterized in that only a single binary number bit changes in each adjacent composite rotational position code.

2. The encoder code plate as set forth in claim 1, wherein within the secondary band, or one of the secondary bands if more than one is present, the sections are evenly grouped into sectors, the number of sectors being equal to the number of sections in the base band and wherein within the secondary band, or said one of the secondary bands: (i) the value of the binary numbers increase in one direction within alternating sectors and then decrease in said direction in the remaining sectors; and (ii) the binary number in each section which is adjacent to a section in an adjacent sector is the same as the binary number in said section in the adjacent sector.

3. The encoder code plate as set forth in claim 2, wherein, if more than one secondary band is present, the sections in another one of the secondary bands are evenly grouped into sectors, the number of sectors being equal in number to the number of sections in said one secondary band and wherein in said another one of the secondary bands: (i) the value of the binary numbers in the sections increase in one direction within alternating sectors and then decrease in said direction in the remaining sectors; and (ii) the binary number in each section which is adjacent to a section in an adjacent sector is the same as the binary number in said section in the adjacent sector.

4. The encoder code plate as set forth in claim 2, wherein the binary numbers comprise gray code numbers.

5. The encoder code plate as set forth in claim 4, wherein the count is an odd number and each sector includes at least one section which is sized differently than the other sections within the sector.

6. The encoder code plate as set forth in claim 4, wherein said count is a 360 count.

7. A method for creating an absolute encoder code plate having a sequence of composite rotational position codes representing positions of a desired count which is not limited to a power of two and which allows determination of absolute rotative position on the code plate, the method comprising:
   dividing the count into a first factor which is a power of two and one or more other factors;
   providing a substrate;
   forming a base band and one or more secondary bands on the substrate, the secondary band(s) and base band being substantially concentric about an axis and equal in number to the total number of factors;
   dividing the base and secondary band(s) into a number of sectors equal to the first factor;
   forming a factored relationship among the base and secondary bands by
   (a) sectioning each of the sectors of the secondary band, or a first one of the secondary bands if more than one is present, into a number of sections corresponding to the other factor, or one of the other factors if there is more than one other factor,
   (b) then, if a second secondary band is present, (i) subdividing each sector of the second secondary band into subsectors corresponding in number to the other factor used in sectioning the first one of the secondary bands and (ii) then sectioning each of the subsectors of the second secondary band into a number of sections corresponding to another one of the other factors,
   (c) then, for each of any further secondary bands which are present, (i) subdividing each sector into subsectors corresponding in number to the product of said one of the other factors and said another one of the other factors and any further ones of the other factors which have already been used in sectioning any of said further secondary bands and (ii) then sectioning each of the subsectors of said further secondary band into a number of sections corresponding to a further one of the other factors,
   whereby a factored relationship is formed among the sections of the secondary band(s) and the sectors of the base band with the number of sections on the secondary band, or one of the secondary bands if more than one is present, being equal to the count; and
   affixing identifiers to the substrate for identifying each sector of the base band and each section of the secondary band(s) on the substrate as a binary number comprising at least one bit, the sections and sectors being arrayed and the identifiers being applied so that a sequence of composite rotational position codes corresponding in number to the count are formed by the identifiers lying along imaginary radial lines placed at successive predetermined rotational positions about said axis, said composite rotational position codes being characterized in that only a single binary number bit changes in each adjacent composite rotational position code.

8. The method of claim 7, further comprising the step of providing means for simultaneously reading the code plate at two or more positions.

9. The method as set forth in claim 7, wherein the step of affixing an identifier to the substrate comprises the steps of affixing the identifiers so that within each secondary band: (i) the binary numbers increase in one direction within alternating sectors or subsectors and then decrease in said direction in the remaining sectors or subsectors; and (ii) the binary number in each section which is adjacent to a section in an adjacent sector or subsector is the same as the binary number in said section in the adjacent sector or subsector.

10. The method as set forth in claim 2, wherein within the base band and each secondary band the associated sectors or subsectors are of substantially equal size.

11. The method as set forth in claim 9, wherein the count is an odd number and each sector includes at least one section which is sized differently than the other sections within the sector.

12. The method as set forth in claim 9, wherein said step of affixing an identifier identifying each sector of the base band and each section of the secondary band on the substrate as a binary number comprises using a gray code number as said binary number.

13. An encoder code plate made by the method set forth in claim 9.

14. An absolute encoder for measuring positions of a desired count, the encoder comprising:
   a code plate having a substrate with at least two bands, the bands having sections corresponding to the positions, and an identifier affixed to the substrate for identifying each section;
   a detector for detecting the position of the code plate indicated by the identifier; and
   at least one secondary detector for simultaneously detecting at least one other position of the code plate to provide error checking.

15. The encoder of claim 14 wherein the detector and secondary detector(s) comprise an emitter for emitting a light array, and wherein the detector comprises a detector detecting the light array.

16. The encoder of claim 15 wherein the encoder is a rotary encoder comprising three sets of emitters and detectors, each emitter and detector set being spaced generally 120 degrees apart.

17. The encoder of claim 16 wherein the substrate comprises a number of sectors equal to a power of two.

18. The encoder of claim 17 wherein one of the bands comprises a base band having a number of sections equal to and associated with the sectors, and wherein the secondary band(s) comprise a number of sections to establish a factored relationship among the base band and the secondary band(s), such that one of the secondary band(s) comprises a number of sections equal to the desired count.

19. The encoder of claim 18 wherein the identifier comprises a binary code affixed to the substrate for identifying each section on the substrate.

20. The encoder of claim 19 wherein the binary code comprise a gray code.

21. The encoder of claim 20 wherein the binary "1" and binary "0" numbers are represented on the code plate by tracks having opaque and translucent areas representative of the binary numbers, and wherein the emitters and detectors determine whether an area is a binary "0" or binary "1" by determining whether a light of the array emitted by the emitter is detected by the detector through the translucent areas.

22. An absolute encoder code plate for representing positions of a desired count other than powers of two, the code plate comprising:
   a substrate having a base band and at least one secondary band, the base band and the secondary band(s) being generally concentric about an axis and each base band and secondary band(s) being sectioned into a number of sections, the base band having a number of sections equal to a power of two,
   wherein in the secondary band, or one of the secondary bands if more than one is present, the sections are evenly grouped into sectors, the number of sectors being equal to the number of sections in the base band; and
   identifiers representing binary number bits for the sections of the base band and secondary band(s),
   wherein within the secondary band, or said one of the secondary bands: (i) the value of the binary numbers increase in one direction within alternating sectors and then decrease in said direction in the remaining sectors; and (ii) the binary number in each section which is adjacent to a section in an adjacent sector is the same as the binary number in said section in the adjacent sector,
   wherein said identifiers form a sequence of composite rotational position codes corresponding in number to the count, said composite rotational position codes being characterized in that only a single binary number bit changes in each adjacent composite rotational position code so that absolute identification of the rotative position on the code plate may be determined when transitioning between adjacent composite rotational position codes.

23. The encoder code plate as set forth in claim 22, wherein, if more than one secondary band is present, the sections in another one of the secondary bands are evenly grouped into sectors, the number of sectors being equal in number to the number of sections in said one secondary band and wherein in said another one of the secondary bands: (i) the value of the binary numbers in the sections increase in one direction within alternating sectors and then decrease in said direction in the remaining sectors; and (ii) the binary number in each section which is adjacent to a section in an adjacent sector is the same as the binary number in said section in the adjacent sector.

24. The encoder code plate as set forth in claim 22, wherein the binary numbers comprise gray code numbers.

25. The encoder code plate as set forth in claim 22, wherein the count is an odd number and each sector includes at least one section which is sized differently than the other sections within the sector.

26. The encoder code plate as set forth in claim 22, wherein the count is an even number which is not a power of two and within each secondary band which is present the sections within each sector are of substantially equal size.

27. An absolute encoder code plate for representing positions of a desired count which is not a power of two, the code plate comprising:

a substrate having a base band and at least one secondary band, the base band and the secondary band(s) being substantially linear and each base band and secondary band(s) being sectioned into a number of sections, the base band having a number of sections equal to a power of two; and identifiers for identifying each section on the substrate as a binary number comprising at least one bit, the sections being arrayed and the identifiers being applied so that a sequence of composite linear position codes corresponding in number to the count are formed by the identifiers lying at successive predetermined linear positions on said substrate, said composite linear position codes being characterized in that only a single binary number bit changes in each adjacent composite linear position code and the composite linear position code corresponding to a last number of the count differs from the composite linear position code corresponding to a first number of the count by only a single binary number bit.

28. The encoder code plate as set forth in claim 27, wherein within the secondary band, or one of the secondary bands if more than one is present, the sections are evenly grouped into sectors, the number of sectors being equal to the number of sections in the base band and wherein within the secondary band, or said one of the secondary bands: (i) the value of the binary numbers increase in one direction within alternating sectors and then decrease in said direction in the remaining sectors; and (ii) the binary number in each section which is adjacent to a section in an adjacent sector is the same as the binary number in said section in the adjacent sector.

29. The encoder code plate as set forth in claim 28, wherein, if more than one secondary band is present, the sections in another one of the secondary bands are evenly grouped into sectors, the number of sectors being equal in number to the number of sections in said one secondary band and wherein in said another one of the secondary bands: (i) the value of the binary numbers in the sections increase in one direction within alternating sectors and then decrease in said direction in the remaining sectors; and (ii) the binary number in each section which is adjacent to a section in an adjacent sector is the same as the binary number in said section in the adjacent sector.

30. The encoder code plate as set forth in claim 29, wherein the binary numbers comprise gray code numbers.

31. The encoder code plate as set forth in claim 30, wherein the count is an odd number and each sector includes at least one section which is sized differently than the other sections within the sector.

32. The encoder code plate as set forth in claim 30, wherein the count is an even number which is not a power of two and within each secondary band which is present the sections within each sector are of substantially equal size.

33. The encoder code plate as set forth in claim 30, wherein the count is a 360 count.

34. A method for creating an absolute encoder code plate having a sequence of composite linear position codes representing positions of a desired count which is not limited to a power of two and which allows determination of absolute linear position on the code plate, the method comprising:

dividing the count into a first factor which is a power of two and one or more other factors;

providing a substrate;

forming a base band and one or more secondary bands on the substrate, the secondary band(s) and base band being substantially linear and equal in number to the total number of factors;

dividing the base and secondary band(s) into a number of sectors equal to the first factor;

forming a factored relationship among the base and secondary bands by (a) sectioning each of the sectors of the secondary band, or a first one of the secondary bands if more than one is present, into a number of sections corresponding to the other factor, or one of the other factors if there is more than one other factor, (b) then, if a second secondary band is present, (i) subdividing each sector of the second secondary band into subsectors corresponding in number to the other factor used in sectioning the first one of the secondary bands and (ii) then sectioning each of the subsectors of the second secondary band into a number of sections corresponding to another one of the other factors, (c) then, for each of any further secondary bands which are present, (i) subdividing each sector into subsectors corresponding in number to the product of said one of the other factors and said another one of the other factors and any further ones of the other factors which have already been used in sectioning any of said further secondary bands and (ii) then sectioning each of the subsectors of said further secondary band into a number of sections corresponding to a further one of the other factors, whereby a factored relationship is formed among the sections of the secondary band(s) and the sectors of the base band with the number of sections on the secondary band, or one of the secondary bands if more than one is present, being equal to the count; and affixing identifiers to the substrate for identifying each sector of the base band and each section of the secondary band(s) on the substrate as a binary number comprising at least one bit, the sections and sectors being arrayed and the identifiers being applied so that a sequence of composite linear position codes corresponding in number to the count are formed by the identifiers at successive predetermined linear positions on said substrate, said composite linear position codes being characterized in that only a single binary number bit changes in each adjacent composite linear position code.

35. The method as set forth in claim 34, wherein the step of affixing an identifier to the substrate comprises the steps of affixing the identifiers so that within each secondary band: (i) the binary numbers increase in one direction within alternating sectors or subsectors and then decrease in said direction in the remaining sectors or subsectors; and (ii) the binary number in each section which is adjacent to a section in an adjacent sector or subsector is the same as the binary number in said section in the adjacent sector or subsector.

36. The method as set forth in claim 35, wherein within the base band and each secondary band the associated sectors or subsectors are of substantially equal size.

37. The method as set forth in claim 35, wherein the count is an odd number and each sector includes at least one section which is sized differently than the other sections within the sector.

38. The method as set forth in claim 35, wherein said step of affixing an identifier identifying each sector of the base band and each section of the secondary band on the substrate as a binary number comprises using a gray code number is said binary number.

39. An encoder code plate made by the method set forth in claim 38.

40. A method for creating an absolute encoder code disk having a sequence of composite position codes representing positions of a desired count which is not a power of two and which allows determination of absolute rotative position on the code disk, the method comprising:
   providing a substrate;
   forming a base band and one or more secondary bands on the substrate; and
   applying identifiers representing binary number bits to the base band and secondary band(s), said identifiers forming a sequence of composite position codes corresponding in number to the count, said composite position codes being characterized in that only a single binary number bit changes in each adjacent composite position code.

41. The method as set forth in claim 40, including
   dividing the count into a first factor which is a power of two and one or more other factors, the number of secondary bands being equal to the number of other factors; and
   dividing the base band into a number of sections equal to the first factor and dividing the secondary band(s) into a number of sections to form a factored relationship among the sections of the base band and the secondary band(s), the number of sections in the secondary band, or one of the secondary bands if more than one is present, being equal to the count.

42. The method as set forth in claim 41, wherein said step of applying said identifiers comprises applying said identifiers to the sections.

43. The method as set forth in claim 42, including
   evenly grouping said sections in the secondary band, or one of the secondary bands if more than one is present, into sectors, the number of sectors being equal to the number of sections in the base band; and
   applying said identifiers so that within said secondary band: (i) the value of the binary numbers increase in one direction within alternating sectors and then decrease in said direction in the remaining sectors; and (ii) the binary number in each section which is adjacent to a section in an adjacent sector is the same as the binary number in said section in the adjacent sector.

44. The method as set forth in claim 43, including, if more than one secondary band is present,
   evenly grouping said sections in another one of the secondary bands into sectors, the number of sectors being equal to the number of sections in the one secondary band; and
   applying said identifiers so that within said another one of the secondary bands: (i) the value of the binary numbers increase in one direction within alternating sectors and then decrease in said direction in the remaining sectors; and (ii) the binary number in each section which is adjacent to a section in an adjacent sector is the same as the binary number in said section in the adjacent sector.

45. The method as set forth in claim 44, wherein said step of applying said identifiers to the sections comprises applying tracks representing gray code numbers, said tracks being capable of being read by a reader device.

46. The method as set forth in claim 45, wherein the step of forming a base band and one or more secondary bands includes the step of arranging the base band and said one or more secondary bands generally concentrically.

47. The method of claim 45, further comprising the step of providing means for simultaneously reading the tracks on the code disk at two or more angularly displaced positions on the code disk.

48. An absolute encoder code disk having a sequence of composite position codes representing positions of a desired count which is not a power of two and which allows determination of absolute rotative position on the code plate, the code disk comprising:
   a substrate;
   a base band and one or more secondary bands on the substrate, said base band and one or more secondary bands being generally concentric about an axis; and
   identifiers representing binary number bits on the base band and secondary band(s), said identifiers forming a sequence of composite position codes corresponding in number to the count, said composite position codes being characterized in that only a single binary number bit changes in each adjacent composite position code.

49. The encoder code disk as set forth in claim 48, wherein
   the base band and secondary band(s) are sectioned into a number of sections to form a factored relationship among the sections of the base band and secondary band(s), the base band having a number of sections equal to a power of two,
   within the secondary band, or one of the secondary bands if more than one is present, the sections are evenly grouped into sectors, the number of sectors being equal to the number of sections in the base band, and
   within the secondary band, or said one of the secondary bands: (i) the value of the binary numbers increase in one direction within alternating sectors and then decrease in said direction in the remaining sectors; and (ii) the binary number in each section which is adjacent to a section in an adjacent sector is the same as the binary number in said section in the adjacent sector.

50. The encoder code disk as set forth in claim 49, wherein, if more than one secondary band is present, the sections in another one of the secondary bands are evenly grouped into sectors, the number of sectors being equal in number to the number of sections in said one secondary band and wherein in said another one of the secondary bands: (i) the value of the binary numbers in the sections increase in one direction within alternating sectors and then decrease in said direction in the remaining sectors; and (ii) the binary number in each section which is adjacent to a section in an adjacent sector is the same as the binary number in said section in the adjacent sector.

51. The encoder code disk as set forth in claim 50, wherein the binary numbers comprise gray code numbers.

52. The encoder code disk as set forth in claim 51, wherein the count is an odd number and each sector includes at least one section which is sized differently than the other sections within the sector.

53. The encoder code disk as set forth in claim 51, wherein the count is an even number which is not a power of two and within each secondary band which is present the sections within each sector are of substantially equal size.

54. An absolute encoder for determining absolute position, said encoder comprising:

a code plate having at least two bands;

identifiers on the bands which form a sequence of composite position codes corresponding in number to a count;

a first means at one position on the code plate for reading the identifiers to determine the composite position code at said one position; and a second means at a second position on the code pate for reading the identifiers to determine the composite position code at said second position to provide error checking.

55. The encoder as set forth in claim 54, wherein the first and second means each comprises an emitter for emitting a light array and a detector for detecting the light array.

56. The encoder as set forth in claim 55, wherein each emitter is positioned on a side of the code plate opposite from the detector and said identifiers comprise tracks of opaque and translucent areas representative of binary numbers.

57. The encoder as set forth in claim 54, including a third means at a third position on the code pate for reading the identifiers to determine the composite position code at said third position.

58. The encoder as set forth in claim 54, wherein said bands are arranged concentrically.

59. The encoder as set forth in claim 54, wherein said bands are arranged linearly and substantially parallel to each other.

* * * * *